United States Patent
Kamalakannan et al.

(10) Patent No.: US 9,159,163 B2
(45) Date of Patent: Oct. 13, 2015

(54) TOP VIEW SITE MAP GENERATION SYSTEMS AND METHODS

(71) Applicant: Honeywell International Inc., Morristown, NJ (US)

(72) Inventors: Arunkumar Kamalakannan, Chennai (IN); Rajagopal Palanivelu, Pondicherry (IN); Arun Vijayakumari Mahasenan, Trivandrum (IN)

(73) Assignee: Honeywell International Inc., Morristown, NJ (US)

( * ) Notice: Subject to any disclaimer, the term of this patent is extended or adjusted under 35 U.S.C. 154(b) by 163 days.

(21) Appl. No.: 13/737,623

(22) Filed: Jan. 9, 2013

(65) Prior Publication Data

US 2014/0192041 A1 Jul. 10, 2014

(51) Int. Cl.
| | |
|---|---|
| *G06T 15/10* | (2011.01) |
| *G06F 17/00* | (2006.01) |
| *G06T 1/00* | (2006.01) |
| *G06T 15/20* | (2011.01) |
| *G06T 17/00* | (2006.01) |
| *G06T 7/00* | (2006.01) |

(52) U.S. Cl.
CPC ............... *G06T 17/00* (2013.01); *G06T 7/0065* (2013.01); *G06T 2210/04* (2013.01)

(58) Field of Classification Search
CPC ....................................................... G06T 11/00
See application file for complete search history.

(56) References Cited

U.S. PATENT DOCUMENTS

| | | | |
|---|---|---|---|
| 5,898,438 A | | 4/1999 | Stewart et al. |
| 6,593,926 B1 * | | 7/2003 | Yamaguchi et al. ........... 345/427 |
| 2008/0181488 A1 * | | 7/2008 | Ishii et al. ...................... 382/154 |
| 2009/0324058 A1 * | | 12/2009 | Sandage et al. ............... 382/154 |
| 2011/0074926 A1 * | | 3/2011 | Khan et al. ....................... 348/46 |
| 2011/0187704 A1 * | | 8/2011 | Chen et al. ..................... 345/419 |
| 2011/0273573 A1 * | | 11/2011 | Sato ............................ 348/220.1 |
| 2011/0316978 A1 * | | 12/2011 | Dillon et al. ..................... 348/46 |
| 2012/0084167 A1 * | | 4/2012 | Corlett .......................... 705/26.3 |
| 2013/0100307 A1 * | | 4/2013 | Curcio et al. ............... 348/222.1 |
| 2013/0235250 A1 * | | 9/2013 | Fainstain ....................... 348/345 |

* cited by examiner

*Primary Examiner* — Kee M Tung
*Assistant Examiner* — Frank Chen
(74) *Attorney, Agent, or Firm* — Brooks, Cameron & Huebsch, PLLC

(57) ABSTRACT

Systems and methods for top view site map generation can include receiving a number of non-top view images of an area and generating a top view site map for the area utilizing the number of non-top view images.

19 Claims, 4 Drawing Sheets

US 9,159,163 B2

TOP VIEW SITE MAP GENERATION SYSTEMS AND METHODS

TECHNICAL FIELD

The present disclosure relates to top view site map generation systems and methods.

BACKGROUND

A site map can be used to perform a number of tasks (e.g., installing, commissioning, maintaining, and/or trouble shooting an automation system, etc.). The site map can be a top view site map of a location (e.g., room of a building, area of a compound, floor of a building, area, etc.). A top view site map can include a number of objects (e.g., walls, HVAC system, fire system, plumbing, etc.) within the location. The top view site map of the location may not be readily available to a user. For example, a top view site map may not exist for a particular location. The lack of a top view site map for the location can delay the number of tasks to be completed at the particular location.

DETAILED DESCRIPTION

Figure 1:
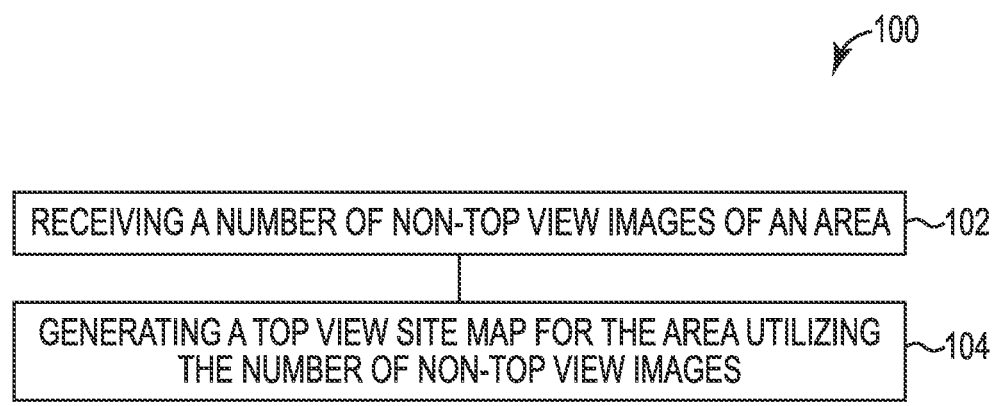
FIG. 1 illustrates an example method for top view site map generation in accordance with one or more embodiments of the present disclosure.

Systems and methods for top view site map generation can include receiving a number of non-top view images of an area and generating a top view site map for the area utilizing the number of non-top view images. A top view site map can include a visual representation of a to view of an area. For example, the top view site map can include a two dimensional visual representation from a position directly above the area. The top view site map can be similar or the same as a schematic or blue print representation of the area.

The top view site map can be used to provide information to a user (e.g., engineer, architect, maintenance, planner, installer, etc.) to perform a number of functions (e.g., marking an object or device location or a zone within the area, monitoring a system, diagnose a wireless system, perform a site survey operations, etc.). Without the top view site map the number of functions may not be performed. The systems and methods described herein can enable a user to generate the top view site map without a top view image of the area.

The top view site map can be generated by capturing a number of non-top view images (e.g., front view images, elevated angle images, etc.) from different positions of the area. For example, a user can capture the number of non-top view images by using a camera (e.g., photographic camera, digital camera, etc.) to photograph the area from different positions. In this example, the different positions can include different locations of the area. The different positions can include capturing an image from each side and/or a number of positions around a perimeter of the area. For example, if the area is a square room of a building an image can be captured from the north, east, south, and west side of the room.

The number of non-top view images can be utilized to generate a top view site map. Generating the top view site map can include utilizing the number of non-top view images to determine a distance and/or coordinate position for a number of objects within the area. For example, a distance can be determined between the camera and a particular object. In another example, a distance can be determined between a first object and a second object. The distance data can also be determined utilizing number of measuring techniques. For example, the distance between a first object and a second object can be measured utilizing acoustic or radio frequency technology to determine a coordinate location of the first object and the second object then calculating the distance between the first object and the second object using the coordinate locations.

The distance data for the number of object within the area can be used to determine a coordinate position for each of the number of objects and to generate the top view site map for the area. The top view site map can include the number of objects at a designated coordinate location based on the determined distance from the camera and the determined distance between the object and other objects.

In the following detailed description, reference is made to the accompanying drawings that form a part hereof. The drawings show by way of illustration how one or more embodiments of the disclosure may be practiced.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of non-top view images" can refer to one or more non-top view images.

FIG. 1 illustrates an example method 100 for top view site map generation in accordance with one or more embodiments of the present disclosure. A top view site map can be utilized to perform a number of functions as described herein. For example, a top view site map can be imported into a wireless site survey computing application (e.g., software module, etc.) to survey a wireless network for a particular area.

At box 102 the method includes receiving a number of non-top view images of an area. The number of non-top view images can include photographic images captured by a camera (e.g., photographic camera, video camera, camera phone, etc.). The number of non-top view images can include images at a front view and/or images at an elevated view.

The front view image can include an image captured parallel to a floor of the area. For example, the front view image can be captured by a camera where the view of the image is parallel to the floor of the area. The elevated view image can include an image that is captured at an elevated position (e.g., position that can capture objects within the area at an angle towards the floor of the area, etc.) with an angle towards the floor of the area. For example, the camera can be at a position above the objects within the area and directed at an angle toward the floor to capture the objects.

The number of non-top view images of an area can include video images (e.g., images captured by a video camera, etc.). The video images can be split into a number of snapshot images (e.g., still frames from the video, etc.) that can be used similar to the non-top view images of the area. The number of snapshot images can each include a corresponding coordinate location (e.g., coordinate location within the area when a corresponding snapshot image was captured, etc.).

The number of non-top view images of the area can include non-top view images captured from a number of different positions and/or directions. For example, the number of non-top view images can include a number of images from a north side of the area, an east side of the area, a south side of the area, and/or a west side of the area. Utilizing non-top view images captured from the number of different positions and/or directions, a top view site map can be generated with an increased number of objects within the area compared to utilizing non-top view images from a single direction. For example, the non-top view images captured from a single direction can lack a particular number of objects within the area due to other objects blocking the view of the particular number of objects. That is, increasing the number of non-top view images can increase the accuracy of the top view site map. In addition, increasing the number of non-top view images with different directions, angles, and/or height positions can increase the accuracy of the top view site map.

At box 104 the method includes generating a top view site map for the area utilizing the number of non-top view images. Generating the top view site map for the area can include calculating a distance and/or a coordinate position for a number of objects within the number of non-top view images. For example, a distance between the camera capturing the non-top view image and the object can be calculating using a number of measurements (e.g., camera angle, compass direction of camera, height of camera, camera location, etc.). A distance between a first object and a second object can also be calculated. For example, the number of measurements and the distance between the camera and the number of objects can be used to calculate a distance between a first object and a second object within the area. A specialized camera (e.g., stereo camera, etc.) can also be used to determine a distance between the first object and the second object.

The distances between each of the number of objects within an area and the camera can be calculated based on the number of measurements. The number of measurements can include a camera angle. The camera angle can be an angle between the view of the camera and the floor of the area. For example, the camera angle can be 0° when the camera view is directed to the floor of the area. In another example the camera angle can be 90° when the camera view is a front view and/or directed in a parallel direction with the floor of the area.

The number of measurements can also include a compass direction of the camera. The compass direction of the camera can be a direction of the camera view. For example, the camera view can be directed to a north direction. In this example, the compass direction of the camera can be north.

The number of measurements can also include a camera height. The camera height can be a distance between the camera and the floor of the area when the camera captures a non-top view image. For example, if a user of the camera captures a front view image of an area the distance from the camera lens to the floor can be five feet (e.g., 1.524 meters, etc.).

The number of measurements can also include a camera location. The camera location can be a coordinate location of the camera when the camera captures a non-top view image. The coordinate location of the camera can be included with a corresponding non-top view image. For example, a coordinate location of a camera can be input into data relating to a particular non-top view image that was captured by the camera at the coordinate location.

The camera location and the distances between each of the number of objects within an area can be used to determine a coordinate position for each of the number of objects and to generate the top view site map for the area. For example, a location of the camera can be input for each of the captured non-top view images. In this example, the location of the camera can be used to determine a coordinate position (e.g., location and/or position within the top view site map, etc.) for each of the number objects based on the distances that are determined. The coordinate position can be used to position each of the number of objects at a location on the top view site map. For example, the location of a camera can be used to determine the location for each of the number of objects and each of the number of objects can be positioned at a corresponding coordinate position on the top view site map.

The generated top view site map can be used for a number of functions. The number of functions can include, but are not limited to: marking an object location and/or a zone within an area, monitoring a system within the area, diagnosing a wireless system within the area, and/or performing site survey operations for the area. The number of functions can be performed by converting the top view site map into a computer-aided design (CAD) file (e.g., (.dxf) file, 3D CAD file, 3D image file, etc.).

Figure 2:
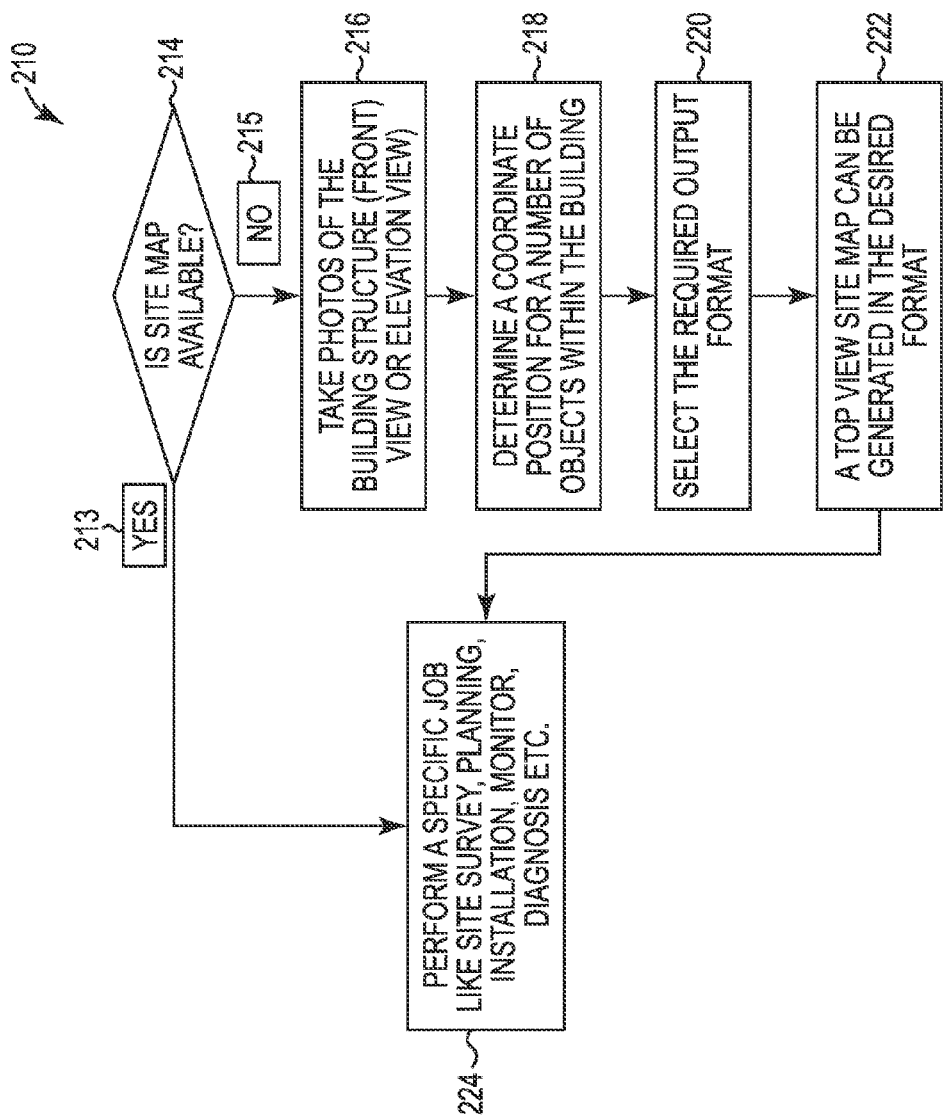
FIG. 2 illustrates an example of a top view site map generation flow diagram in accordance with one or more embodiments of the present disclosure.

FIG. 2 illustrates an example of a top view site map generation method flow diagram 210 in accordance with one or more embodiments of the present disclosure. The top view site map generation method flow diagram can start at 214 by determining whether or not a site map is available for an area. If a site map for the area is available the flow diagram can move to box 224 via path 213. At box 224 the site map for the area can be used to perform a specific job such as a site survey, planning installation, monitor, and/or diagnosis.

If the site map for the area is not available the flow diagram can move to box 216 via path 215. At box 216 a number of photos can be taken (e.g., captured by a photographic camera, etc.) of an area (e.g., building structure, etc.). The number of photos can be captured at a non-top view (e.g., front view, elevated view, etc.). The number of photos can also be captured at a number of different positions and/or directions of the area. For example, the number of photos can be captured from different locations at various directions within the area.

The number of photos can include a number of measurements relating to a relationship with the camera capturing each of the number of photos. The number of measurements can be used to determine coordinate information within the area relating to the location of the camera capturing each of the number of photos.

The coordinate information can be used to determine a number of locations for each of a number of objects within the area at box 218. The coordinate information can be used to determine a distance between a camera capturing a photo and a number of objects. The coordinate information can also be used to determine a distance and/or coordinate position between each of the number of objects.

The distance information for each of the number of objects can be used to generate the site map for the area. For example, the coordinate information and distance information can be used to determine a coordinate position for each object within the top view site map. Each object can be positioned within the top view site map based on the coordinate position of each of the number of objects to generate a top view site map for the area that includes the number of objects At box 220 a desired format for the top view site map can be selected. For example, the desired format can include a number of digital formats including, but not limited to: a CAD file, a joint photographic experts group (JPEG) file, PDF file, 3D CAD file, 3D image file, etc.

At box 222 the top view site map can be generated in the desired format. For example, the top view site map can be generated in a two dimensional (2D) JPEG image file. The top view site map can be converted to a number of other formats. For example, the top view site map in a 2D JPEG image file can be converted to a top view site map in a 3D CAD file. The top view site map can be converted the number of different formats to generate the desired format for the top view site map.

The generated top view site map can be used to perform a specific job such as a site survey, planning installation, monitor, and/or diagnosis at box 224.

Figure 3:
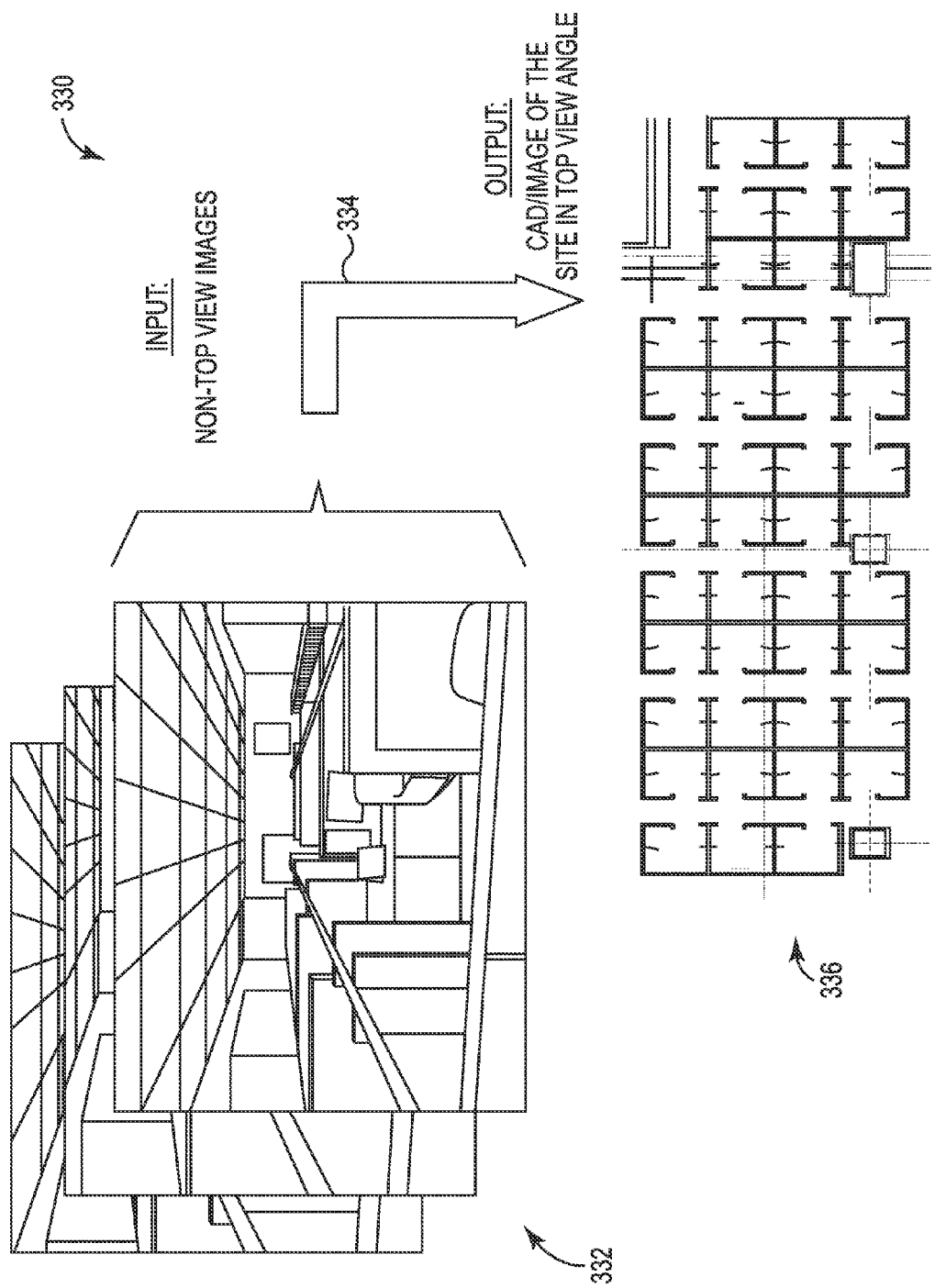
FIG. 3 illustrates an example diagram of top view site map generation in accordance with one or more embodiments of the present disclosure.

FIG. 3 illustrates an example diagram 330 of top view site map generation in accordance with one or more embodiments of the present disclosure. Diagram 330 includes a number of non-top view images 332. The number of non-top view images 332 can include front view images and/or elevated images of an area. The number of non-top view images 332 can include a number of objects. For example, the number of non-top view images can include a number of office cubicles. In another example, the number of non-top view images can include automation systems (e.g., devices within a system, etc.) within the area such as a sensor of an HVAC system within an area.

The number of non-top view images 332 can be input at 334 into a computing device (e.g., computing device 450, etc.) to determine a coordinate position for each of the number of objects within the area. The coordinate position can be determined based on a corresponding location of a camera that captured each of the number of non-top view images 332.

The number of non-top view images 332 can be output to generate a top view site map 336. The top view site map 336 can include the number of objects captured within the number of non-top view images 332. For example, the number of non-top view images 332 can include a number of office cubicles that can be displayed from a top view in the top view site map 336. In this example, the office cubicles can be displayed as a top view to display an orientation of the office cubicles.

The top view site map 336 can be generated in a desired format (e.g., two dimensional image file, two dimensional CAD file, 3D image file, 3D CAD file, etc.). For example, the top view site map 336 can be generated in a 3D CAD file format to enable a user to perform a number of functions within a computing application.

Figure 4:
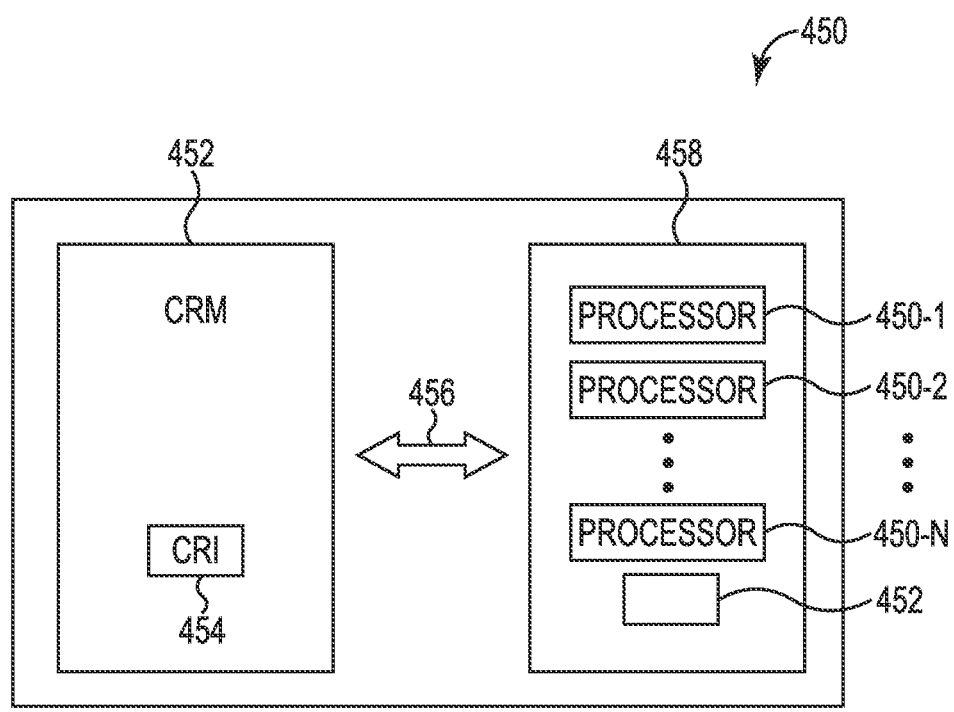
FIG. 4 illustrates a block diagram of an example of a computing device in accordance with one or more embodiments of the present disclosure.

FIG. 4 illustrates a block diagram of an example of a computing device 450 in accordance with one or more embodiments of the present disclosure. The computing device 450 can be a portable computing device (e.g., hand held computing device, laptop, etc.). The computing device 450 can include a communication interface (e.g., wireless network interface controller, IEEE 802.11 adapters, etc.) for receiving a number of non-top view images of an area. The communication interface can be integrated in the computing device 450 and/or be an external card.

The computing device 450, as described herein, can also include a computer readable medium (CRM) 452 in communication with processing resources 450-1, 450-2, . . . , 450-N.

CRM 352 can be in communication with a device 458 (e.g., a Java® application server, among others) having processor resources 450-1, 450-2, . . . , 450-N. The device 458 can be in communication with a tangible non-transitory CRM 452 storing a set of computer-readable instructions (CRI) 454 (e.g., modules) executable by one or more of the processor resources 450-1, 450-2, . . . , 450-N, as described herein. The CRI 454 can also be stored in remote memory managed by a server and represent an installation package that can be downloaded, installed, and executed. The device 458 can include memory resources 458, and the processor resources 450-1, 450-2, . . . , 450-N can be coupled to the memory resources 458.

Processor resources 450-1, 450-2, . . . , 450-N can execute CRI 454 that can be stored on an internal or external non-transitory CRM 452. The processor resources 450-1, 450-2, . . . , 450-N can execute CRI 454 to perform various functions. For example, the processor resources 450-1, 450-2, . . . , 450-N can execute CRI 454 to perform a number of functions (e.g., generating a top view site map for the area utilizing the number of non-top view images, etc.). A non-transitory CRM (e.g., CRM 452, memory resources 458, etc.), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), as well as other types of computer-readable media.

The non-transitory CRM 452 can also include distributed storage media. For example, the CRM 452 can be distributed among various locations.

The non-transitory CRM 452 can be integral, or communicatively coupled, to a computing device, in a wired and/or a wireless manner. For example, the non-transitory CRM 452 can be an internal memory, a portable memory, a portable disk, or a memory associated with another computing resource (e.g., enabling CRIs to be transferred and/or executed across a network such as the Internet).

The CRM 452 can be in communication with the processor resources 450-1, 450-2, . . . , 450-N via a communication path 456. The communication path 456 can be local or remote to a machine (e.g., a computer) associated with the processor resources 450-1, 450-2, . . . , 450-N. Examples of a local communication path 456 can include an electronic bus internal to a machine (e.g., a computer) where the CRM 452 is one of volatile, non-volatile, fixed, and/or removable storage medium in communication with the processor resources 450-1, 450-2, . . . , 450-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 456 can be such that the CRM 452 is remote from the processor resources e.g., 450-1, 450-2, . . . , 450-N, such as in a network relationship between the CRM 452 and the processor resources (e.g., 450-1, 450-2, . . . , 450-N). That is, the communication path 456 can be a network relationship. Examples of such a network relationship can include a local area network (LAN), wide area network (WAN), personal area network (PAN), and the Internet, among others. In such examples, the CRM 452 can be associated with a first computing device and the processor resources 450-1, 450-2, . . . , 450-N can be associated with a second computing device (e.g., a Java® server).

As described herein, a "module" can include computer readable instructions (e.g., CRI 454) that can be executed by a processor to perform a particular function. A module can also include hardware, firmware, and/or logic that can perform a particular function.

As used herein, "logic" is an alternative or additional processing resource to execute the actions and/or functions, described herein, which includes hardware (e.g., various forms of transistor logic, application specific integrated circuits (ASICs)), as opposed to computer executable instructions (e.g., software, firmware) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for top view site map generation, comprising:
   receiving a number of non-top view images of an area from a camera;
   determining position information of the camera for each of the number of non-top view images, wherein the position information includes a camera angle, a camera height, and a camera direction;
   determining a coordinate position of the camera for each of the number of non-top view images, wherein the coordinate position of the camera is included in each of the corresponding number of non-top view images;
   determining a coordinate position of objects within the number of non-top view images based on the position information of the camera, the coordinate position of the camera, and a distance of the objects from the coordinate position of the camera;
   generating a top view site map for the area utilizing the number of non-top view images and the coordinate position of the objects; and
   diagnosing a wireless system within the area by converting the top view site map for the area into a CAD file.

2. The method of claim 1, wherein receiving the number of non-top view images of the area includes taking a number of photos of the area at an elevated angle.

3. The method of claim 1, wherein receiving the number of non-top view images of the area includes taking a number of photos of the area at a front view.

4. The method of claim 1, comprising monitoring a system within the area by converting the top view site map for the area into a CAD file.

5. The method of claim 4, wherein converting the top view site map for the area into the CAD file includes converting the top view site map into a three dimensional CAD file.

6. The method of claim 1, wherein receiving the number of non-top view images of the area includes receiving a video image of the area.

7. The method of claim 1, wherein increasing the number of received non-top view images increases an accuracy of the top view site map.

8. A non-transitory machine-readable medium storing a set of instructions executable by a processor to cause a computer to:
   receive a number of non-top view images of an area from a camera;
   determine position information of the camera for each of the number of non-top view images, wherein the position information includes a camera angle, a camera height, and a camera direction;
   determine a coordinate position of the camera for each of the number of non-top view images, wherein the coordinate position of the camera is included in each of the corresponding number of non-top view images;
   determine a coordinate position for a number of objects within the number of non-top view images based on the position information of the camera and the coordinate positon of the camera, wherein determining the coordinate position for the number of objects includes determining a distance of the number of objects from the coordinate position of the camera;
   generate a top view site map for the area utilizing the number of non-top view images and the coordinate position for the number of objects, wherein the top view site map includes the number of objects; and
   diagnose a wireless system within the area by converting the top view site map for the area into a CAD file.

9. The non-transitory machine-readable medium of claim 8, wherein determining the distance for the number of objects includes utilizing an angle of the camera.

10. The non-transitory machine-readable medium of claim 8, wherein determining the distance for the number of objects includes utilizing compass information.

11. The non-transitory machine-readable medium of claim 8 comprising a set of instructions executable by a processor to cause a computer to select a number of perimeter non-top view images from the number of non-top view images.

12. The non-transitory machine-readable medium of claim 11, wherein the number of perimeter non-top view images includes an image from each side of the area.

13. A system for generating a top view site map, the system comprising a processing resource in communication with a non-transitory computer readable medium, wherein the non-transitory computer readable medium includes a set of instructions and wherein the processing resource is designed to carry out the set of instructions to:

receive a number of non-top view images of an area from a camera, wherein the number of non-top view images are captured by a photographic camera from a number of angles;

determine position information of the camera, wherein the position information includes a camera angle, a camera height, and a camera direction;

determine the camera location for each of the number of non-top view images, wherein the camera location is a coordinate location of the camera when the camera captures each of the number of non-top view images and wherein the coordinate location of the camera is included in the number of non-top view images;

determine a distance between the camera location and a number of objects within the number of non-top view images based on the position information of the camber and the camera location;

determine a coordinate position of the number of objects within the number of non-top view images based on the position information of the camera and the distance between the camera location and the number of objects;

generate a top view site map for the area utilizing the number of non-top view images, wherein the top view site map includes the number of objects; and diagnose a wireless system within the area by converting the top view site map for the area into a CAD file.

14. The system of claim 13, comprising instructions to perform a site survey operation for the area by converting the top view site map for the area into a CAD file.

15. The system of claim 13, wherein a coordinate position is determined for each of the number of objects.

16. The system of claim 13, wherein the non-top view images include height information of the photographic camera.

17. The system of claim 13, wherein the top view site map includes a number of automation systems within the area.

18. The system of claim 13, wherein the number of non-top view images are generated from a video of a number of locations within the area.

19. The system of claim 18, wherein a coordinate location is determined for each corresponding image snapshot of the video.

* * * * *